United States Patent [19]

Nishimura et al.

[11] Patent Number: 4,488,457

[45] Date of Patent: Dec. 18, 1984

[54] MALFUNCTION PREVENTION DEVICE OF AUTOMOTIVE HYDRAULIC TRANSMISSION

[75] Inventors: Sadanori Nishimura; Keiichi Ishikawa; Hiroyuki Shimada, all of Saitama, Japan

[73] Assignee: Honda Giken Kogyo Kabushiki Kaisha, Tokyo, Japan

[21] Appl. No.: 439,773

[22] Filed: Nov. 8, 1982

[30] Foreign Application Priority Data

Nov. 9, 1981 [JP] Japan .................. 56-178311

[51] Int. Cl.³ .............................................. B60K 41/16
[52] U.S. Cl. ........................................ 74/868; 74/869; 74/878
[58] Field of Search ........................... 74/868, 869, 878

[56] References Cited

U.S. PATENT DOCUMENTS

| 3,146,630 | 9/1964 | Ivey | 74/869 |
| 3,401,581 | 9/1968 | Chana | 74/868 X |
| 3,714,849 | 2/1973 | Smith | 74/869 |
| 4,290,325 | 9/1981 | Nishimura | 74/878 X |

FOREIGN PATENT DOCUMENTS 0135256 10/1980 Japan .................................. 74/869
57-79351 5/1982 Japan .

Primary Examiner—Allan D. Herrmann
Assistant Examiner—Dirk Wright
Attorney, Agent, or Firm—Lyon & Lyon

[57] ABSTRACT

An hydraulic transmission interposed between an engine and the wheels of a vehicle is controlled by hydraulic circuits and hydraulically-operated clutches. A shift valve assembly is supplied with oil pressure in accordance with the extent of opening of the throttle of the engine, as well as vehicle governor pressure acting as a vehicle speed signal. The shift valve assembly not only functions to control operation of hydraulic clutches but also acts as a malfunction-preventive valve which operates to impede engagement of the reverse transmission clutch during forward running of the vehicle at a speed higher than a predetermined vehicle speed, irrespective of the throttle valve opening.

1 Claim, 9 Drawing Figures

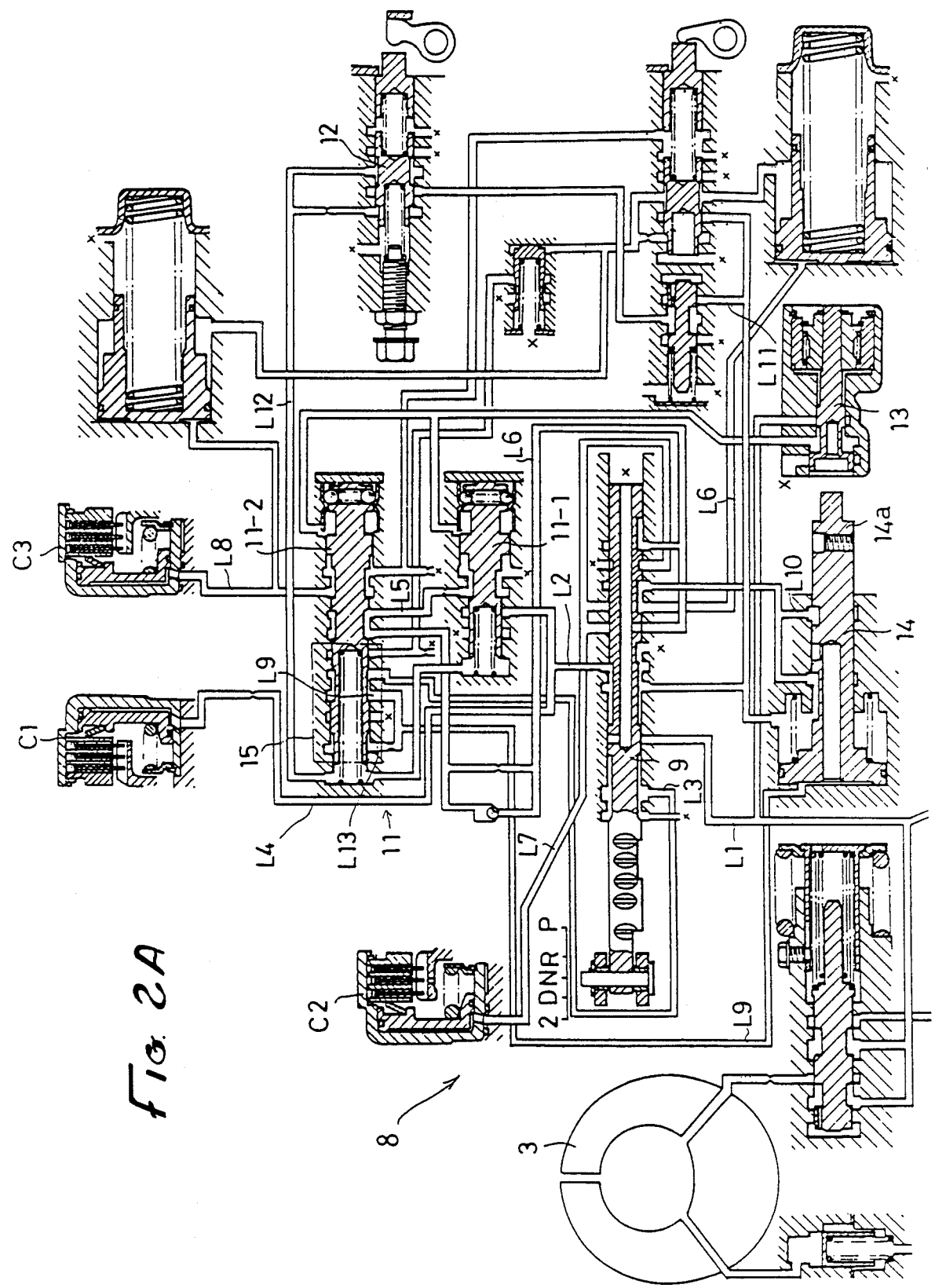

MALFUNCTION PREVENTION DEVICE OF AUTOMOTIVE HYDRAULIC TRANSMISSION

This invention relates to a device for prevention of malfunction of a reverse transmission element in an hydraulic transmission for an engine powered vehicle. The transmission is of the type which includes an hydraulic circuit for establishing engagement of forward transmission elements and also includes an hydraulic circuit for establishing engagement of a reverse transmission element. Selective connection of said circuits to a pressure source is accomplished through the action of a manually-operated valve which is changeable in position between forward and reverse, and which is positioned in the oil hydraulic circuit of the hydraulic transmission. A shift valve assembly acts in response to movement of the manually-operated valve.

Previously, a separate malfunction-preventive valve has been employed for preventing engagement of the reverse drive when the manually-operated valve is shifted to a reverse position by mistake, so long as the vehicle is driven at a speed higher than a predetermined speed. This malfunction-preventive valve was a separate entity hydraulically connected to the shift valve assembly. The present invention makes use of the shift valve assembly itself to serve as a malfunction-preventive valve, without requiring a separate unit having that function.

Other and more detailed objects and advantages will appear hereinafter.

In the drawings:

FIGS. 2 and 2a show a preferred embodiment of an oil hydraulic circuit according to this invention. FIG. 2a is a continuation of the upper portion of FIG. 2.

Figure 1:
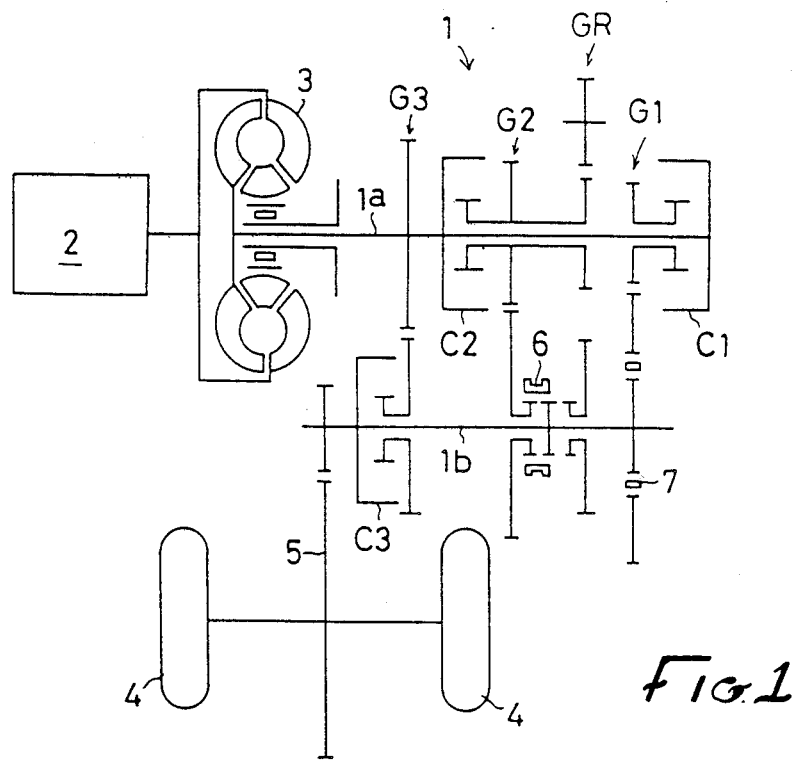
FIG. 1 is a diagram of a change speed transmission to which the device embodying this invention is applicable.

In FIG. 1, reference numeral 1 is a diagram of a transmission which is adapted to perform changeover between three forward positions and one reverse position. The transmission comprises 1st, 2nd and 3rd forward elements or gears G1, G2 and G3 and a reverse element or gear GR arranged between an input shaft 1a and an output shaft 1b. The input shaft 1a is coupled to a vehicle engine 2 through a torque converter 3, and the output shaft 1b is coupled to driving wheels 4 by means of a differential gear 5. The forward gears G1, G2 and G3 are arranged for driving engagement with 1st, 2nd and 3rd speed hydraulic clutches C1, C2 and C3, respectively, and the reverse gear GR is arranged for coupling with the 2nd speed hydraulic clutch C2 in a manner alternating with the 2nd speed forward gear G2. A selector gear 6 may be shifted between a forward position located leftward as viewed in the drawing and a reverse position located rightward therein, and is mounted on the output shaft 1b for selective coupling with the forward gear G2 or the reverse gear GR. Thus, the reverse gear GR can be operative upon engagement of the 2nd hydraulic clutch C2 and displacement of the selector gear 6 to its reverse position.

Figure 2:
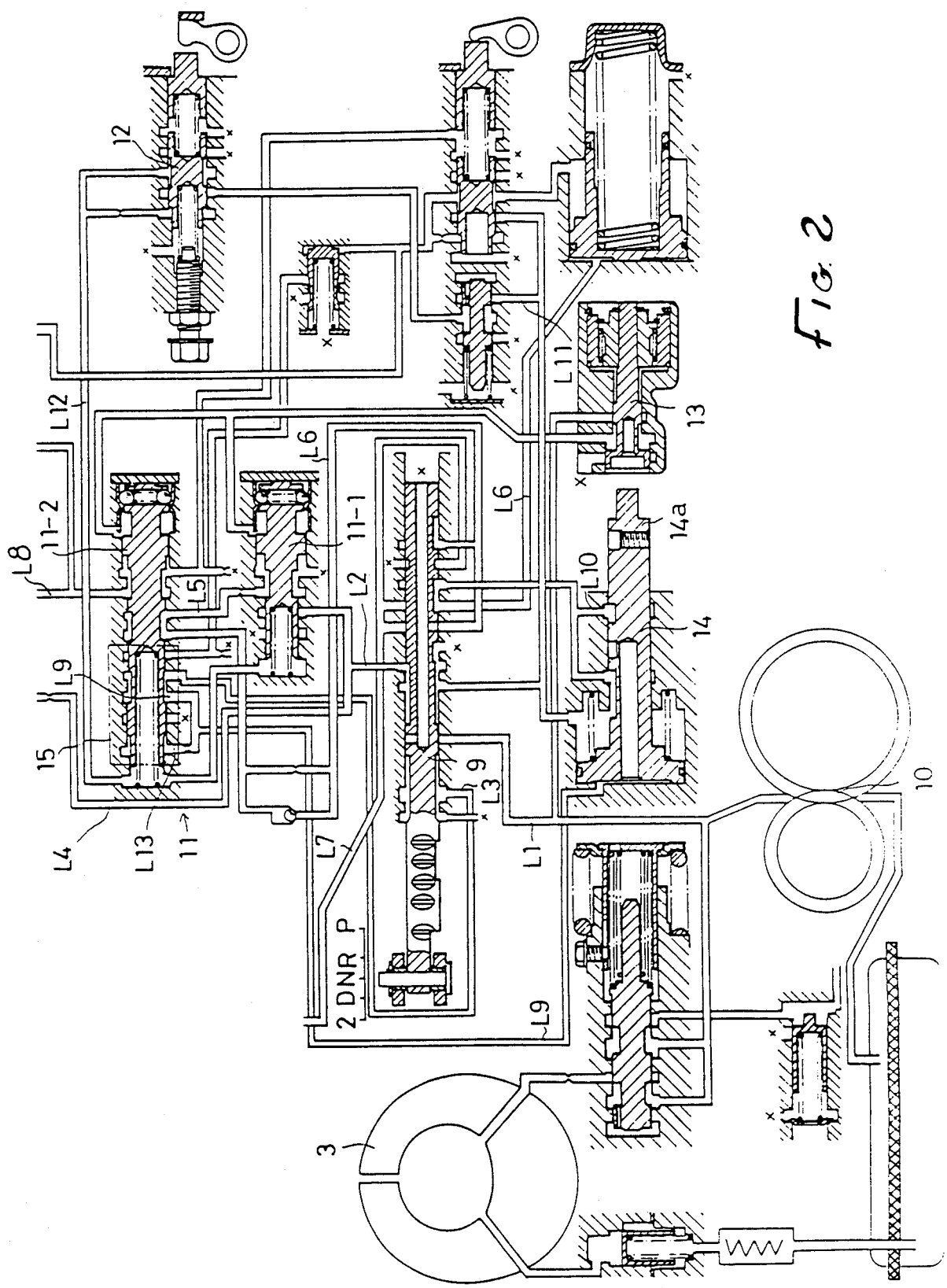

In FIG. 1, reference numeral 7 designated a one-way clutch disposed for driving engagement with the 1st speed forward gear G1 for permitting overspeed rotation of the output shaft 1b. The above hydraulic clutches C1, C2 and C3 as well as the selector gear 6 can be controlled by an oil hydraulic circuit 8 as shown in FIG. 2. The oil hydraulic circuit 8 comprises a manually-operated valve 9 movable to 5 positions, namely, a parking position P, a reverse position R, a neutral position N, a forward position D and a 2nd speed keeping position 2. A first oil line L1 for feeding oil from a hydraulic oil source 10 is provided for selective communication with a second oil line L2. The second oil line L2 is located on the inlet side of a circuit for establishing engagement of the forward transmission elements when the manually-operated valve 9 assumes the position D. The first oil line L1 also provides selective communication with a third oil line L3 located on the inlet side of a circuit for establishing engagement of the reverse transmission element when the manually-operated valve 9 assumes the position R.

The circuit for establishing engagement of the forward transmission elements is arranged to allow oil feeding to the 1st speed hydraulic clutch C1 (FIG. 2a) through a fourth oil line L4 branching from the second oil line L2 and oil feeding to the 2nd or the 3rd speed hydraulic clutches C2 or C3 through a shift valve assembly 11 leading to the second oil line L2.

The shift valve assembly 11 comprises a first shift valve 11-1 which is arranged at a relatively upstream location for effecting speed change between 1st speed and 2nd speed, and a second shift valve 11-2 which is arranged at a relatively downstream location for effecting speed change between 2nd speed and 3rd speed. The two shift valves 11-1 and 11-2 are connected to each other through a fifth oil line L5 and each is disposed to have one or the left end acted upon by throttle pressure corresponding to the throttle opening of an associated engine and supplied from a throttle valve 12 which is drivingly engaged with an accelerator pedal or the like. The valves 11-1 and 11-2 are each disposed to have the other or right end acted upon by governor pressure corresponding to the vehicle speed and supplied from a vehicle speed-responsive governor valve 13.

With an increase in the governor pressure corresponding to an increase in the vehicle speed, the first shift valve 11-1 is displaced from its right or 1st speed position to its left or 2nd speed position to connect the oil line L2 to a sixth oil line L6 leading from the outlet side of the second shift valve 11-2 through the fifth oil line L5. On this occasion, when the manually-operated valve 9 is in the position D, oil feeding takes place to the 2nd speed hydraulic clutch C2 through a seventh oil line L7 which is arranged for connection with the sixth oil line L6 when the manually-operated valve is in the position D. Accordingly, the 2nd speed gear G2 operates to cause changeover from the 1st speed position to the 2nd speed position. With a further increase in the vehicle speed, the second shift valve 11-2 is displaced from its right or 2nd speed position to its left or 3rd speed position to cause changeover from connection of the fifth oil line L5 with the sixth oil line L6, to connection of the same line L5 with an eighth oil line L8 leading to the 3rd speed hydraulic clutch C3. This causes oil feeding to the 3rd speed hydraulic clutch C3, whereby the 3rd speed forward gear G3 is rendered operative to cause changeover from the 2nd speed position to the 3rd speed position.

With an increase in the throttle opening, the above described displacement of each shift valve 11-1 or 11-2 is made at a higher vehicle speed in proportion to the increase of the throttle pressure which counteracts the governor pressure through the valve 11-1 or 11-2. The throttle opening-vehicle speed characteristics obtained by the above displacement of the valves 11-1 and 11-2 from the 1st to the 2nd speed and from the 2nd to the 3rd speed are shown by the curves a and b, respectively, in FIG. 5. The characteristics obtained by the displacement from the 2nd to the 1st speed and from the 3rd to the 2nd speed are shown by the curves a' and b', respectively, in the same figure, wherein a' and b' indicate gear shifting points at slightly lower speeds than those indicated by a and b, respectively, due to the hysteresis characteristics of the shift valves 11-1 and 11-2.

The circuit for establishing engagement of the reverse transmission element is arranged for supplying pressurized oil from the third oil line L3 to a servo valve 14 through a malfunction-preventive valve 15, and also through a ninth oil line L9 leading from the outlet of the same valve 15, to cause displacement of the servo valve 14 to its reverse position on the right side as viewed in FIG. 2. The servo valve 14 has a coupling portion 14a coupled to the selector gear 6 for changeover between forward running and reverse running. The above displacement of the servo valve 14 to the reverse position first causes changeover of the selector gear 6 to its reverse position to connect the reverse gear GR to the output shaft 1b, and then causes connection of the ninth oil line L9 to a tenth oil line L10 leading from the outlet of the serve valve 14 by way of the same valve 14. On this occasion, when the manually-operated valve 9 is in the position R there takes place oil feeding to the second hydraulic clutch C2 through the above seventh oil line L7 which is arranged for connection to the tenth oil line L10 to thereby render the reverse gear GR operative.

The malfunction-preventive valve 15 has the function of interrupting oil feeding to the serveo valve 14 through the ninth oil line L9, which is effected when the vehicle is driven at a speed higher than a predetermined speed. According to this invention, the shift valve assembly 11 is adapted to also serve as the malfunction-preventive valve 15, in such a manner that the valve assembly 11 can be controlled in response to the vehicle speed signal or governor pressure alone, while simultaneously the supply of the signal indicative of the throttle opening to the valve assembly 11 is interrupted when the manually-operated valve 9 is in the position R.

According to the illustrated embodiment, an eleventh oil line L11 leading to the inlet of the throttle valve 12 is connected to the drain port when the manually-operated valve 9 assumes the position R to interrupt the supply of the pressure to the shift valve assembly 11 from the throttle valve 12. However, the invention is not limited to this arrangement. For instance, the device may alternatively be arranged such that the manually-operated valve 9 is arranged across a twelfth oil line L12 leading from the outlet side of the throttle valve 12, to block the same line L12 when the manually-operated valve 9 assumes the position R.

Figure 3:
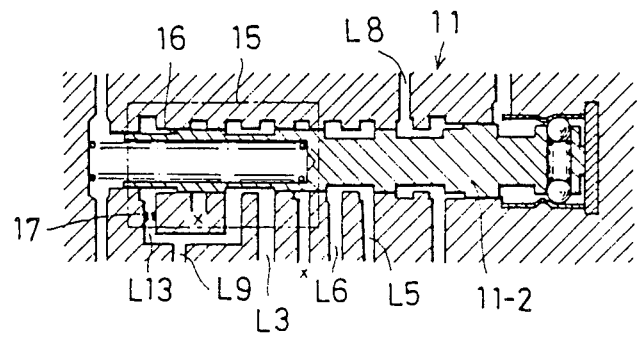
FIG. 3 and FIG. 4 are views of the shift valve in the 2nd speed position, and in the 3rd speed position, respectively.
Figure 4:
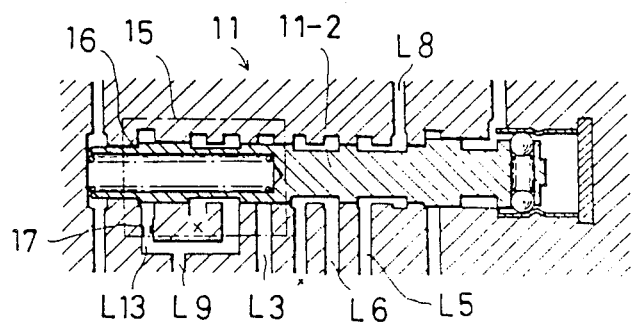
Figure 5:
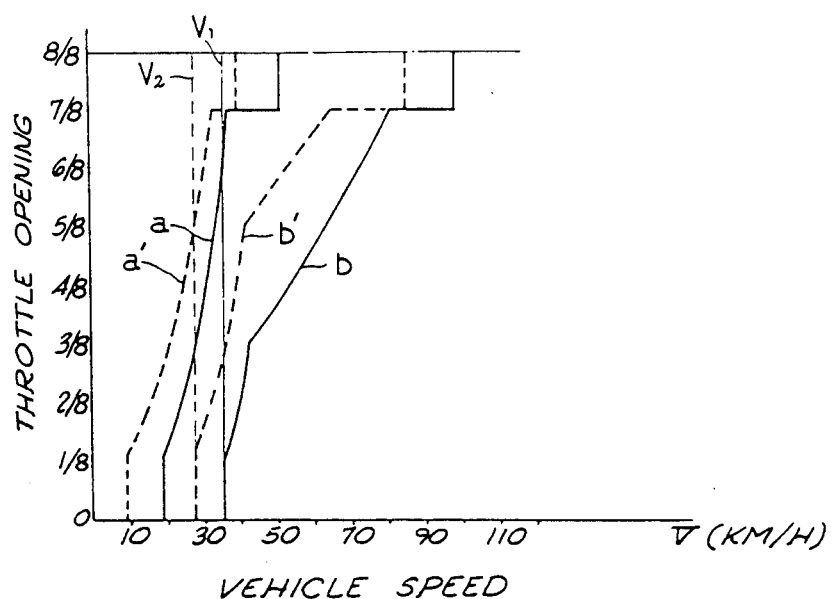
FIG. 5 is a graph showing gear shifting characteristics of the shift valve.

Further, in the shift valve assembly 11, which comprises a plurality of valves, for instance, valves 11-1 and 11-2 as shown in FIG. 2, either of the individual valves 11-1 or 11-2 may serve as the malfunction-preventive valve 15. In the illustrated embodiment, the second shift valve 11-2 is arranged to serve as the malfunction-preventive valve 15. The third oil line L3 is connected to the ninth oil line L9 when the valve 11-2 is in the 2nd speed position as shown in FIG. 3. On the other hand, the communication between the above lines L3 and L9 is interrupted when the valve 11-2 is displaced to the 3rd speed position as shown in FIG. 4. Thus, when the manually-operated valve 9 is in its position R, the control of the operation of the shift valve 11-2 is solely dependent on the governor pressure or the vehicle speed, since the supply of the throttle pressure to the valve 11-2 is interrupted as described above. On this occasion, as shown in FIG. 5, the valve 11-2 is displaceable from the 2nd speed position to the 3rd speed position at a first predetermined vehicle speed $V_1$. This speed $V_1$ is equal to a vehicle speed for changeover from the 2nd speed to the 3rd speed available at idle throttle opening where the throttle opening is zero, with the manually-operated valve 9 in the position D. The valve 11-2 is displaceable from the 3rd speed position to the 2nd speed position at a second predetermined vehicle speed $V_2$ equal to a vehicle speed for changeover from the 3rd speed to the 2nd speed available at the idling throttle opening, with the valve 9 in the position D.

In the illustrated arrangement, the governor valve 13 operates to generate governor pressure corresponding to a reverse running speed when the transmission is in the reverse gear position. When the reverse running speed reaches the above first predetermined vehicle speed $V_1$, the second shift valve 11-2 is displaced to the 3rd speed position to interrupt the communication between the third oil line L3 and the ninth oil line L9, resulting in disengagement of the reverse transmission element GR. To prevent this, the second shift valve 11-2 is formed with a pressure-applying surface 16 upon which the line pressure acts, which is supplied through a thirteenth oil line L13 branching from the ninth oil line L9, thereby keeping the second shift valve 11-2 at the 2nd speed position against the governor pressure even when the reverse running vehicle speed is increased.

In FIGS. 3 and 4, reference numeral 17 designates an orifice which is arranged in the thirteenth oil line L13. This orifice 17 serves to delay the action of the line pressure upon the pressure-applying surface 16 to ensure smooth displacement of the second valve 11-2 to the 3rd speed position in response to the governor pressure, when the manually-operated valve is shifted to the position R during the forward running of the vehicle at a speed higher than the above-mentioned first predetermined speed $V_1$.

The operation of the device is as follows: First, when the manually-operated valve 9 is changed to the position R during the forward running of the vehicle, the first oil line L1 is connected to the third oil line L3. If the vehicle speed at this changeover is lower than the first predetermined vehicle speed $V_1$, the second shift valve 11-2 is kept in the 2nd speed position so that there takes place oil feeding to the servo valve 14 through the ninth oil line L9 to establish engagement of the reverse transmission element GR with the clutch C2. If the vehicle speed at the changeover is higher than the first predetermined vehicle speed $V_1$, the shift valve 11-2 is changed to the 3rd speed position as previously noted, to cause interruption of the communication between the third oil line L3 and the ninth oil line L9. Accordingly, on this occasion, even if the manually-operated valve 9 is changed to the position R, the above engagement of the reverse transmission element with the clutch C2 is not established, whereby the transmission 1 comes into a substantially neutral position. When the vehicle speed is then decreased below the second predetermined vehicle speed $V_2$, the second shift valve 11-2 is changed from the 3rd speed position to the 2nd speed position to establish the engagement of the reverse transmission element GR.

Figure 6:
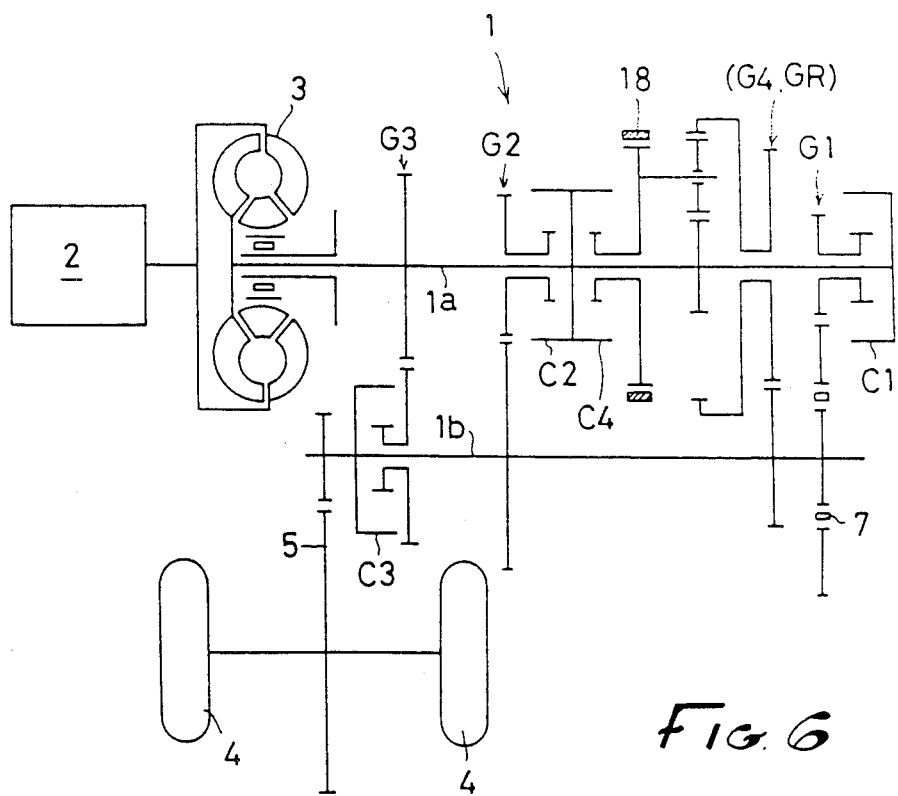
FIG. 6 is a diagram showing another example of a change speed transmission to which the present invention is applicable.
Figure 7:
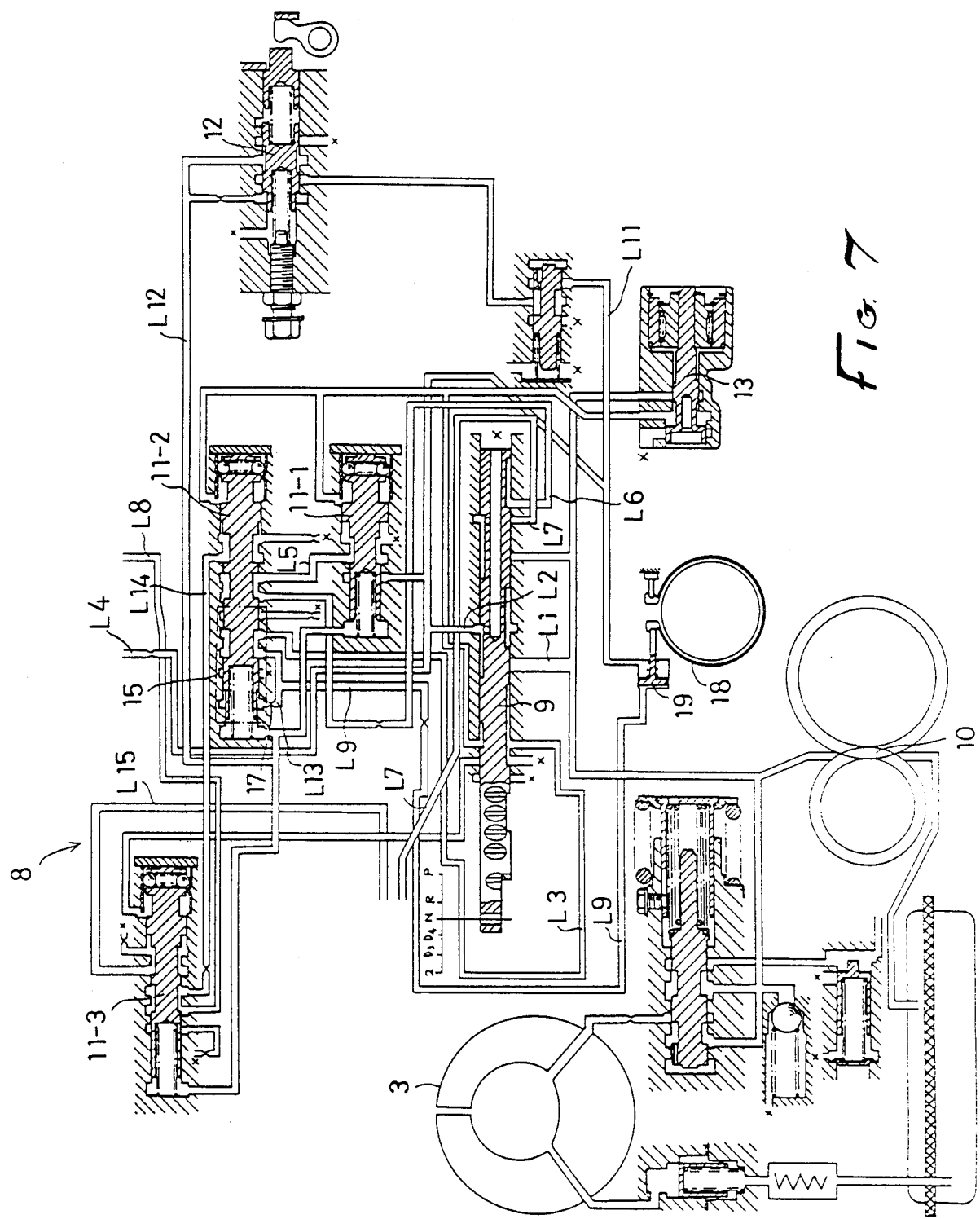
FIG. 7 is a view of an oil hydraulic circuit applicable to the transmission of FIG. 6.
Figure 7A:
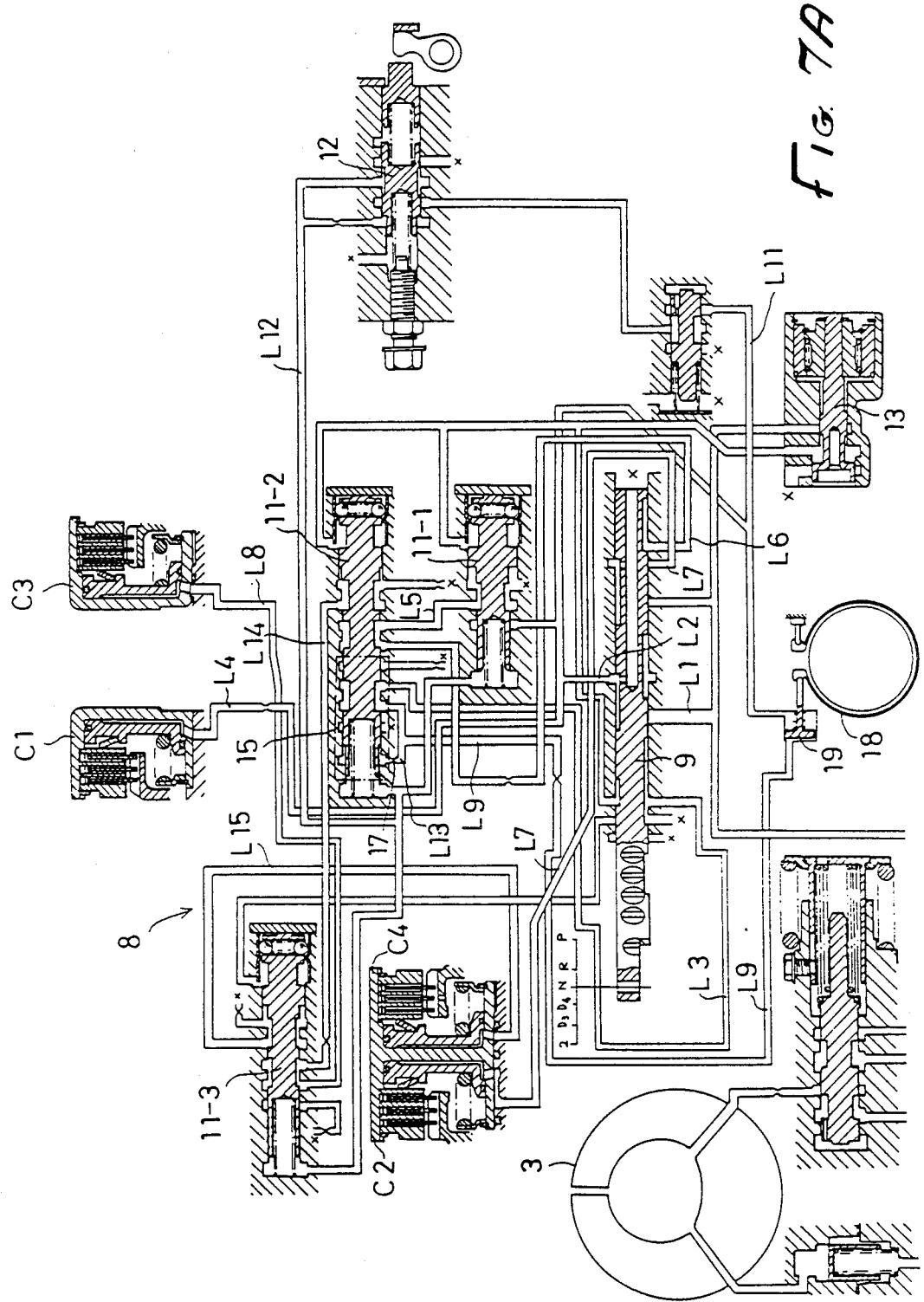
FIG. 7a is a continuation of the upper portion of FIG. 7.

FIG. 6 shows a modified transmission 1 which is adapted to perform changeover between four forward positions and one reverse position. Its oil hydraulic circuit is shown in FIG. 7. The transmission includes a fourth forward gear G4 and a reverse gear GR formed by a common planetary gear mechanism. The reverse gear GR is adapted to be operative when a reverse brake 18 (FIG. 6) is drivingly engaged, while the fourth forward gear G4 is adapted to be operative when a 4th speed hydraulic clutch C4 is drivingly engaged, when the reverse brake 18 is released.

The oil hydraulic circuit 8 in the embodiment of FIG. 7 is distinguished from that of the previous embodiment solely in that a third shift valve 11-3 for changeover from 3rd speed to the 4th speed, is arranged downstream of the second shift valve 11-2 for connection thereto through a fourteenth oil line L14. Consequently, oil feeding takes place to each of the 3rd and 4th hydraulic clutches C3 and C4, respectively, through the eighth oil line L8 and a fifteenth oil line L15, both of which branch from the third shift valve 11-3. A piston 19 is provided for actuation of the reverse brake 18, which supersedes the servo valve 14 of the first embodiment. There is no other significant difference between the two embodiments, except for those described above. The present embodiment can operate in the same manner as the first embodiment.

In either embodiment, the shift valve assembly 11 as a unit is disposed to be supplied with throttle pressure as a throttle opening signal as well as vehicle governor pressure as a vehicle speed signal. However, the shift valve assembly 11 may be controlled by electrical signals indicative of the above parameters. In this case, the supply of the electrical throttle opening signal to the valve 11 may be interrupted by means of a switch which is arranged to be turned off when the manually-operated valve 9 is shifted to the position R.

As described in the foregoing, the device according to this invention is constructed such that the supply of the throttle opening signal to the shift valve is interrupted through shifting of the manually-operated valve to its reverse position, and the shift valve is adapted to serve as the malfunction-preventive valve and operable to impede engagement of the reverse transmission element with its associated clutch during forward running of the vehicle at a vehicle speed higher than a predetermined vehicle speed, irrespective of the throttle valve opening. Thus, the device of the invention is far more simple in structure than one in which a malfunction-precentive valve is provided separately from the shift valve, and can maintain an excellent standard of performance.

Having fully described our invention, it is to be understood that we are not to be limited to the details herein set forth but that our invention is of the full scope of the appended claims.

We claim:

1. In a hydraulic transmission for use in a vehicle driven by an internal combustion engine, the transmission having an oil hydraulic circuit provided with a manually-operated valve, a hydraulic pressure source, a circuit for establishing engagement of forward transmission elements, disposed for connection with said hydraulic pressure source through the shifting action of said manually-operated valve to a forward position thereof, the improvement comprising, in combination: a shift valve assembly controlling operation of said engagement-establishing circuit, means for supplying said shift valve assembly with two control signals counteracting each other, one indicative of the throttle opening of the engine and the other indicative of the vehicle speed, a circuit for establishing engagement of a reverse transmission element, disposed for connection with said hydraulic pressure source through the shifting action of said manually-operated valve to its reverse position, means disposed for engagement with said second-mentioned engagement-establishing circuit and operable in response to said control signal indicative of the vehicle speed for causing disengagement of the same circuit from the reverse transmission element at a vehicle speed higher than a predetermined vehicle speed, and means whereby said shift valve assembly is controlled solely by said vehicle speed signal while simultaneously said throttle opening signal to said shift valve assembly is interrupted when said manually-operated valve is in a reverse running position, whereby said shift valve assembly operates also as a malfunction-preventive valve.

* * * * *